United States Patent
Sato

(10) Patent No.: US 9,467,675 B2
(45) Date of Patent: Oct. 11, 2016

(54) THREE-DIMENSIONAL IMAGE DATA GENERATING METHOD AND THREE-DIMENSIONAL IMAGE DATA GENERATING DEVICE

(75) Inventor: Koji Sato, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 313 days.

(21) Appl. No.: 14/237,011

(22) PCT Filed: Aug. 2, 2012

(86) PCT No.: PCT/JP2012/069718
§ 371 (c)(1),
(2), (4) Date: Feb. 4, 2014

(87) PCT Pub. No.: WO2013/021915
PCT Pub. Date: Feb. 14, 2013

(65) Prior Publication Data
US 2014/0210813 A1    Jul. 31, 2014

(30) Foreign Application Priority Data
Aug. 5, 2011    (JP) .................................. 2011-172260

(51) Int. Cl.
*H04N 13/00*    (2006.01)

(52) U.S. Cl.
CPC ...... *H04N 13/0018* (2013.01); *H04N 13/0048* (2013.01)

(58) Field of Classification Search
CPC ..................... H04N 13/0048; H04N 13/0029; H04N 13/0066; H04N 13/0059; H04N 21/4122; H04N 21/43635; H04N 21/440272; H04N 21/4858; H04N 21/816; H04N 7/007; H04N 7/0122; H04N 13/0409; H04N 13/0411; H04N 13/0422; H04N 13/0445
See application file for complete search history.

(56) References Cited

U.S. PATENT DOCUMENTS

| | | | | |
|---|---|---|---|---|
| 5,627,582 A | * | 5/1997 | Muramoto | ......... H04N 13/0422 348/43 |
| 2003/0048354 A1 | | 3/2003 | Takemoto et al. | |
| 2004/0100584 A1 | * | 5/2004 | Takagi | ................. H04N 7/0122 348/556 |
| 2008/0303896 A1 | | 12/2008 | Lipton et al. | |
| 2011/0128411 A1 | * | 6/2011 | Masubuchi | .......... H04N 5/2355 348/231.99 |
| 2013/0100247 A1 | | 4/2013 | Tsukagoshi | |

FOREIGN PATENT DOCUMENTS

| | | |
|---|---|---|
| JP | 2003-111101 A | 4/2003 |
| JP | 2010-529778 A | 8/2010 |
| JP | 2012-010032 A | 1/2012 |

OTHER PUBLICATIONS

Official Communication issued in International Patent Application No. PCT/JP2012/069718, mailed on Oct. 30, 2012.

* cited by examiner

*Primary Examiner* — Sultana M Zalalee
(74) *Attorney, Agent, or Firm* — Keating & Bennett, LLP

(57) ABSTRACT

The present invention provides an image data generating method in which a combined image is not distorted at the boundary area between a left eye image and a right eye image even when the combined image has been compressed with lossy compression among three-dimensional image data generating methods in which a combined image is generated by combining a left eye image and a right eye image. The three-dimensional image data generating method includes a combined image generating step (SA2 or SA3) in which the combined image including a buffer region between the left eye image and the right eye image is generated while the left eye image and the right eye image are arranged, and an image date compressing step (SA4) in which the picture signal of the combined image generated in the combined image generating step (SA2 or SA3) is compressed with lossy compression.

2 Claims, 7 Drawing Sheets

THREE-DIMENSIONAL IMAGE DATA GENERATING METHOD AND THREE-DIMENSIONAL IMAGE DATA GENERATING DEVICE

FIELD OF THE INVENTION

The present invention relates to a three-dimensional image data generating method and a three-dimensional image data generating device that obtain a combined image by combining a left eye image and a right eye image while arranging the images.

DESCRIPTION OF THE RELATED ART

A known three-dimensional image data generating method is to obtain a combined image by combining a left eye image and a right eye image while arranging the images. Such a three-dimensional image data generating method generates a combined image by combining a plurality of left eye images and right eye images while arranging the images, for example, as disclosed in Japanese PCT National Publication No. 2010-529778.

SUMMARY OF THE INVENTION

By the way, the configuration disclosed in Japanese PCT National Publication No. 2010-529778 generates a combined image by combining a plurality of images while arranging the images. Thus, the combined image is sometimes distorted at the portion in which the images adjoin to each other when being compressed with lossy compression. Generally, lossy compression, such as a moving picture experts group (mpeg) or a joint photographic experts group (jpeg), of the picture signal of an image sometimes may distort the image due to the influence of the surrounding image data. Accordingly, in the lossy compression of the picture signal of an image generated by combining a left eye image and a right eye image while arranging the images as described above, the images are influenced from each other beyond the boundary area between the images at the boundary area. Thus, the lossy compression of the picture signal of the combined image possibly causes a distortion of the image at the boundary area between the left image and the right image.

In the event of a distortion of a combined image obtained by combining a left eye image and a right eye image while arranging the images due to the lossy compression as described above, the distortion remains on each of the left eye image and the right eye image when the images are displayed on a display device using the combined image. This possibly displays an incongruous three-dimensional image.

In light of the foregoing, an objective of the present invention is to provide an image data generating method in which an combined image is not distorted at the boundary area between a left eye image and a right eye image even when the combined image has been compressed with lossy compression among the three-dimensional image data methods in which a combined image obtained by combining the left eye image and the right eye image is generated.

A three-dimensional image data generating method according to an embodiment of the present invention generates a combined image while arranging a left eye image and a right eye image, and includes: a combined image generating step in which the combined image including a buffer region between the left eye image and the right eye image is generated while the left eye image and the right eye image are arranged; and an image data compressing step in which the picture signal of the combined image are compressed with lossy compression.

The three-dimensional image data generating method according to an embodiment of the present invention can prevent the combined image from being distorted at the boundary area between the left eye image and the right eye image when the picture signal of the combined image obtained by combining the left eye image and the right eye image while arranging the images is compressed with lossy compression.

DETAILED DESCRIPTION OF THE EMBODIMENTS

Figure 1:
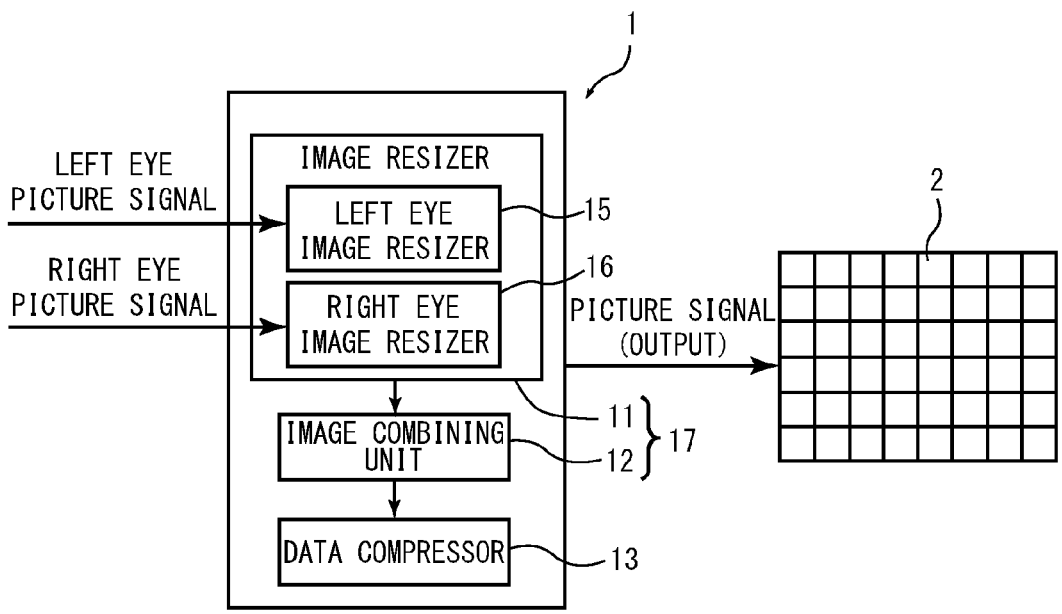
FIG. 1 is a schematic block diagram of the configuration of a three-dimensional image data generating device according to a first embodiment.

The three-dimensional image data generating method according to an embodiment of the present invention generates a combined image while arranging a left eye image and a right eye image; and includes a coupled image generating step in which the combined image including a buffer region between the left eye image and the right eye image while the left eye image and the right eye image are arranged, and an image data compressing step in which the picture signal of the combined image is compressed with lossy compression (a first method).

Forming the buffer region between the left eye image and the right eye image in the method can prevent the left eye image and the right eye image from directly adjoining each other in the combined image. This can prevent an image distortion from occurring at the boundary area between the left eye image and the right eye image even after the lossy compression of the picture signal of the combined image obtained by combining the left eye image and the right eye image while arranging the images. Thus, the method can prevent the reduction of the display quality of the three-dimensional image even after the lossy compression of the picture signal of the combined image.

The buffer region is formed between the left eye image and the right eye image and is displayed in a darker color than the original image. The buffer region is formed in a range in which the boundary between the left eye image and the right eye image is influenced when the three-dimensional image is displayed after the lossy compression of the combined image obtained by combining the left eye image and the right eye image.

The combined image including dark image regions located so as to face the buffer region across each of the left eye image and right eye image is generated in the combined image generating step in the first method (a second method).

Thus, in the combined image, not only the buffer region is formed between the left eye image and the right eye image, but also the dark image regions are formed on both of the edges in the direction in which the left eye image and the right eye image are arranged.

When the buffer region is formed between the left eye image and the right eye image, the left eye image moves to the left side and the right eye image moves to the right side by the width of the buffer region. This increases the space between the left eye image and the right eye image. In that case, the image location of the three-dimensional image obtained by the left eye and the right eye moves to the rear of the display screen. In light of the foregoing, providing dark image regions on both of the edges of each of the left eye image and the right eye image in the direction in which the left eye image and the right eye image are arranged as the method described above prevents the whole of the left eye image from moving to the left side and prevents the whole of the right eye image from moving to the right side.

Accordingly, providing dark image regions on both of the edges of each of the left eye image and the right eye image in the direction in which the left eye image and the right eye image are arranged as the method described above can prevent the image location of the three-dimensional image obtained by the left eye and the right eye from moving to the rear of the display screen.

The dark image regions are displayed in a darker color than the original image.

The combined image generating step includes in the first or second method: an image resizing step in which each of the left eye image and the right eye image is resized such that the buffer region is formed while the left eye image and the right eye image are arranged; and an image combining step in which the combined image is generated by combining the left eye image and the right eye image that have been resized in the image resizing step while arranging the left eye image and the right eye image (a third method).

This can readily provide a combined image including a left eye image, a right eye image, and a buffer region.

The combined image generating step includes a dark image forming step in which the buffer region is formed by changing the edges of the left eye image and the right eye image that adjoin each other into dark images in the first or second method (a fourth method).

This can surely form the buffer region between the left eye image and the right eye image.

The combined image generating step includes an image luminance changing step in which the buffer region is formed by making the luminance of the edges of the left eye image and the right eye image that adjoin each other lower toward the edges in the first or second method (a fifth method).

This makes the image darker toward the edges and thus forms a buffer region on the edges of the images. This can reduce the incongruity at the boundaries between the buffer region and each of the left eye image and the right eye image.

A three-dimensional image data generating device according to an embodiment of the present invention generates a combined image while arranging a left eye image and a right eye image and includes: a combined image generating unit configured to generate the combined image including a buffer region between the left eye image and the right eye image while arranging the left eye image and the right eye image; and an image data compressor configured to compress the picture signal of the combined image with lossy compression (a first configuration).

The configuration forms a buffer region between the left eye image and the right eye image. This can prevent the combined image combined while the left eye image and the right eye image are arranged from being distorted at the boundary area between the left eye image and the right eye image when the picture signal of the combined image is compressed with lossy compression. This can prevent the reduction of the display quality of the three-dimensional image even when the left eye image and the right eye image are arranged to combine the images as an image and then compressed with lossy compression.

The combined image generating unit generates the combined image including dark image regions located so as to face the buffer region across each of the left eye image and right eye image in the first configuration (a second configuration).

This can prevent the left eye image to be recognized with a left eye from moving to left and prevent the right eye image to be recognized with a right eye from moving to right when a buffer region is provided between the left eye image and the right eye image. Thus, the configuration can prevent the image location obtained by the left eye and the right eye from moving to the rear of the display screen.

Hereinafter, the embodiments of the three-dimensional image data generating method of the present invention will be described with reference to the appended drawings. Note that the dimensions of the components in each drawing do not faithfully show the actual dimensions and the dimensional ratio of the components.

[First Embodiment]

(Overall Structure)

FIG. 1 is a schematic block diagram of the configuration of a three-dimensional image data generating device according to a first embodiment. A three-dimensional image data generating device 1 outputs a combined image by combining a left eye image and a right eye image while arranging the images side by side. Note that the left eye image and the right eye image are obtained by, for example, using a camera capable of taking a three-dimensional image. The combined image output from the three-dimensional image data generating device 1 is output to a display device 2, such as a liquid crystal display device, and then is displayed as a three-dimensional image on the display device 2. In other words, the display device 2 divides the left eye image and right eye image that have been input as an image and, for example, alternately displays the left eye image and the right eye image such that the images look a three-dimensional image.

Note that the display device 2 can have any configuration that is capable of displaying a three-dimensional image, for example, a plasma display.

As illustrated in FIG. 1, the three-dimensional image data generating device 1 includes an image resizer 11 configured to resize each of the left eye image and the right eye image that have been obtained from a camera or the like, and an image combining unit 12 configured to generate a combined image while arranging the resized left eye image and right eye image side by side. The three-dimensional image data generating device 1 further includes a data compressor 13 (image data compressor) configured to compress the picture signal of a combined image obtained by using the image combining unit 12 with lossy compression to reduce the data size of the combined image. Note that the image resizer 11 and the image combining unit 12 correspond to a combined image generator 17 in the present embodiment.

The lossy compression herein means a data compression method in which the compressed and developed data does not perfectly match the data before the compression. Mpeg and jpeg are examples of the lossy compression.

Figure 2A:
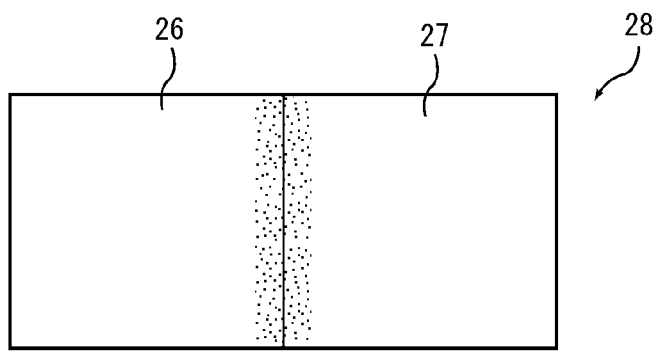
FIG. 2A is a diagram of an image distortion at the boundary area between a left eye image and a right eye image in a combined image obtained from the images.
Figure 3A:
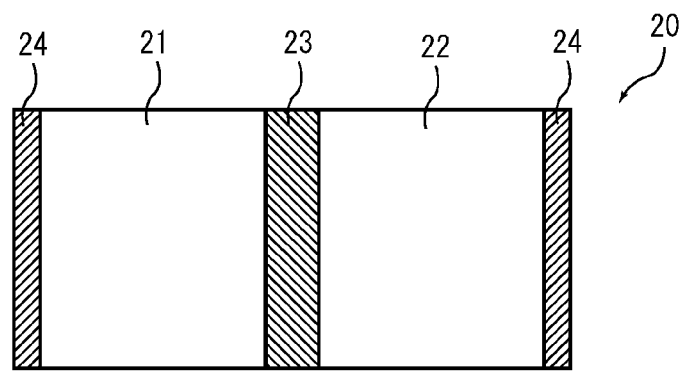
FIG. 3A is a diagram of a combined image including black image regions on both of the lateral edges of each image.

For example, as illustrated in FIG. 2A and FIG. 3A, the three-dimensional image data generating device 1 of the present embodiment is configured to generate an image data by outputting a left eye image and a right eye image as an image while laterally arranging the images, that is referred to as a side-by-side image data generation. A left eye image and a right eye image that have been obtained by, for example, using a camera capable of taking a three-dimensional image are input as a left eye picture signal and a right eye picture signal respectively, to the three-dimensional image data generating device 1.

The image resizer 11 converts the left eye picture signal and the right eye picture signal so as to reduce the image sizes of the left eye image and the right eye image. In other words, the image resizer 11 resizes the left eye image and the right eye image so as to form black image regions 23 and 24 (see FIG. 3A) on both edges of each of a left eye image 21 and a right eye image 22 while laterally arranging the left eye image 21 and the right eye image 22 as described below.

In greater detail, the image resizer 11 includes, as illustrated in FIG. 1, a left eye image resizer 15 configured to convert the left eye picture signal so as to reduce the image size of the left eye image and a right eye image resizer 16 configured to convert the right eye picture signal so as to reduce the image size of the right eye image. The left eye image resizer 15 and the right eye image resizer 16 reduce the image sizes of the left eye image and the right eye image so as to generate a combined image while laterally arranging the left eye image and the right eye image and to form the black image regions 23 and 24 on both edges of each of the images. Specifically, the left eye image resizer 15 and the right eye image resizer 16 are configured to reduce the lateral size of the left eye image and the right eye image respectively, to less than half of the original size. In other words, each of the left eye image and the right eye image is laterally resized to the size obtained by subtracting the regions to be the black image regions 23 and 24 to be described below from the lateral size of a combined image to be output and then laterally halving the subtracted lateral size. This can surely form the black image regions 23 and 24 to be described below in the combined image. Note that the black image region 23 preferably has a width, for example, of 20 pixels and the black image region 24 preferably has a width, for example, of 10 pixels.

Note that the images are resized in the left eye image resizer 15 and the right eye image resizer 16 in a similar manner to a conventional method for resizing an image. Thus, the detailed description will be omitted.

The image combining unit 12 is configured to obtain a combined image 20 (see FIG. 3A) by combining the left eye image 21 and the right eye image 22 that have been resized with the image resizer 11 while laterally arranging the images. In other words, the image combining unit 12 generates a picture signal using the resized left eye picture signal and right eye picture signal such that the left eye image 21 and the right eye image 22 are laterally arranged in a frame.

The image combining unit 12 generates the combined image 20 while laterally arranging the left eye image 21 and the right eye image 22 such that the black image regions 23 and 24 are formed on both of the lateral edges of each of the resized left eye image 21 and right eye image 22.

The data compressor 13 is configured to compress the image signal of the combined image 20 generated by the image combining unit 12 with lossy compression so as to reduce the data size of the combined image 20.

As described above, the lossy compression of the combined image in the data compressor 13 reduces the data size of the image signal output from the three-dimensional image data generating device 1 in comparison with the data size of the image signal without lossy compression.

Figure 2B:
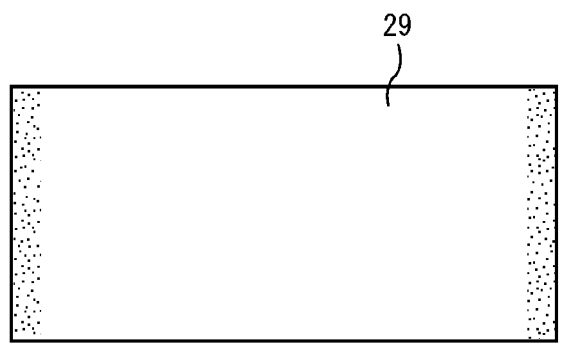
FIG. 2B is a diagram of a three-dimensional image displayed using the image data illustrated in FIG. 2A.

However, the above-mentioned lossy compression deteriorates the image quality in comparison with the image before the compression, for example, due to the loss of the image data of the details or the reduction in the clearness of the image. Especially, as illustrated in FIG. 2A, the lossy compression of a combined image 28 in which two images (a left eye image 26 and a right eye image 27) are arranged side by side causes the image to largely be distorted because of the influence of the images to each other at the boundary (at the dotted part in FIG. 2A). This causes the distortion on both of the lateral edges of a three-dimensional image 29 (the dotted part in the drawing) when the combined image 28 is displayed as the three-dimensional image 29 as illustrated in FIG. 2B. This can bring a feeling of strangeness to the viewer or can prevent the viewer from recognizing the image as a three-dimensional image.

Figure 3B:
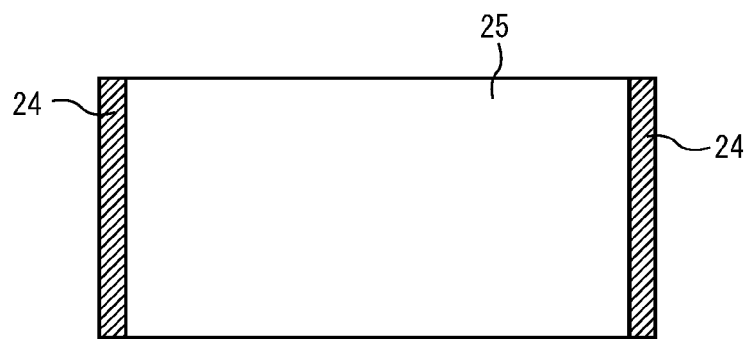
FIG. 3B is a diagram of a three-dimensional image displayed using the image data illustrated in FIG. 3A.

In light of the foregoing, the black image region 23 (buffer region) is provided between the left eye image 21 and the right eye image 22 in the present embodiment as illustrated in FIG. 3A. This prevents the left eye image 21 and the right eye image 22 from directly adjoining each other at the boundary in the combined image 20. This can prevent the combined image 20 from being distorted at the boundary area between the left eye image 21 and the right eye image 22 even after the lossy compression of the combined image 20. This can prevent the viewer from feeling strange or from not recognizing the image as a three-dimensional image when the combined image 20 is displayed as a three-dimensional image 25 (FIG. 3B).

Figure 4A:
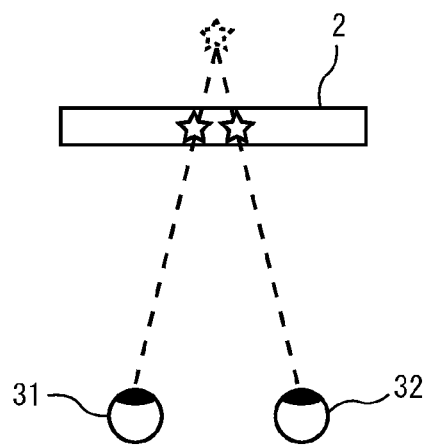
FIG. 4A is a schematic diagram of an image location when a left eye image and a right eye image are displayed near each other.
Figure 4B:
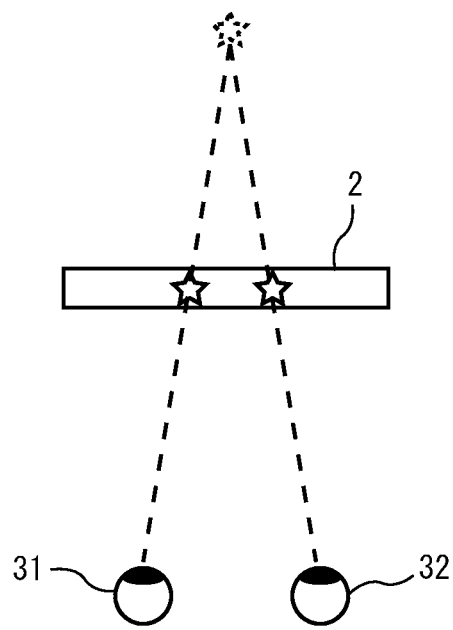
FIG. 4B is a schematic diagram of an image location displayed when a left eye image and a right eye image are separate from each other.

By the way, the left eye image 21 and the right eye image 22 are separate from each other from side to side when the black image region 23 is provided between the left eye image 21 and the right eye image 22 in comparison with when the black image region 23 is not provided. Accordingly, the position of the left eye image 21 to be recognized with the left eye and the position of the right eye image 22 to be recognized with the right eye are separate from each other. FIG. 4B illustrates the state. As illustrated in FIG. 4B, when a viewer recognizes the images displayed on the display device 2 (the stars in the drawing) with both eyes, the image location of the three-dimensional image (the dashed star) moves to the rear of the display screen in comparison with the case when the black image region 23 is not provided (FIG. 4A). Note that a reference sign 31 represents the left eye and a reference sign 32 represents the right eye in FIGS. 4A and 4B.

To solve the problem, in the present embodiment as illustrated in FIG. 3A, the black image regions 24 (dark image region) are formed on the edge of the left eye image 21 and on the edge of the right eye image 22 respectively. The edge of the left eye image 21 where the black image region 24 is formed is located on the opposite side to the edge where the black image region 23 is formed. The edge of the right eye image 22 where the black image region 24 is formed is located on the opposite side to the edge where the black image region 23 is formed. This can prevent the position of the left eye image 21 to be recognized with the left eye and the position of the right eye image 22 to be recognized with the right eye from being separate from each other, and thus can prevent the image location of the three-dimensional image from moving to the rear of the display screen when the viewer sees the display device with both eyes.

As described above, resizing the left eye image and the right eye image using the image resizer 11 forms the black image regions 23 and 24.

Note that the black image regions 24 are displayed at both edges of the screen when the combined image 20 in FIG. 3A is displayed as the three-dimensional image 25 as illustrated in FIG. 3B.

Next, the operation of the three-dimensional image data generating device 1 will be described.

Figure 5:
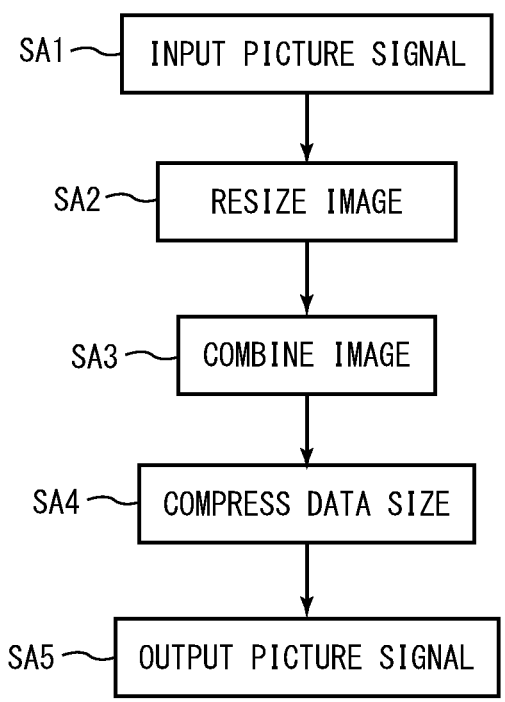
FIG. 5 is a flowchart of a three-dimensional image data generating method according to the first embodiment.

As illustrated in FIG. 5, first, the left eye picture signal and the right eye picture signal (referred to as an input picture signal with combining the picture signals in the FIG. 5) are input to the three-dimensional image data generating device 1 (step SA1). Then, the image resizer 11 converts the left eye picture signal and the right eye picture signal so as to resize each of the left eye image and the right eye image (step SA2). Specifically, the left eye image resizer 15 resizes the left eye image while the right eye image resizer 16 resizes the right eye image. Each of the left eye image resizer 15 and the right eye image resizer 16 reduces the size of each of the left eye image and the right eye image to the size obtained by subtracting the black image regions 23 and 24 from each of the left eye image and the right eye image in the combined image 20.

Next, the image combining unit 12 combines the resized left eye image 21 and right eye image 22 while laterally arranging the images so as to obtain a combined image 20 (step SA3). After that, the data compressor 13 compresses the image signal of the combined image 20 with lossy compression (step SA4). Then, the compressed data is output as an output picture signal to the display device 2 or the like (step SA5).

In that case, resizing the left eye image and the right eye image in step SA2 corresponds to the image resizing step. Obtaining a combined image 20 by combining the resized left eye image 21 and right eye image 22 while laterally arranging the images in step SA3 corresponds to the image combining step. Thus, steps SA2 and SA3 correspond to the combined image generating step. Compressing the picture signal of the combined image 20 with lossy compression in step SA4 corresponds to the image data compressing step.

(Effect of First Embodiment)

The sizes of a left eye image and a right eye image are reduced to less than the sizes of the original images such that the black image region 23 is formed between the left eye image and the right eye image in the combined image 20 obtained by combining the left eye image and the right eye image while arranging the images side by side in the present embodiment. This prevents the left eye image and the right eye image from directly adjoining each other in the combined image 20. This can prevent the combined image 20 from being distorted at the boundary area between the left eye image and the right eye image even after the lossy compression of the combined image 20, and thus can prevent the reduction of the display quality when the combined image is displayed as a three-dimensional image.

Further, the black image regions 24 are formed on the edge of the left eye image 21 and on the edge of the right eye image 22 respectively. The edge of the left eye image 21 where the black image region 24 is formed is located on the opposite side to the edge where the black image region 23 is formed. This can prevent the image location of the three-dimensional image obtained by combining the left eye image to be recognized with the left eye image and the right eye image to be recognized with the right eye from moving to the rear of the display screen.

[Second Embodiment]

Figure 6:
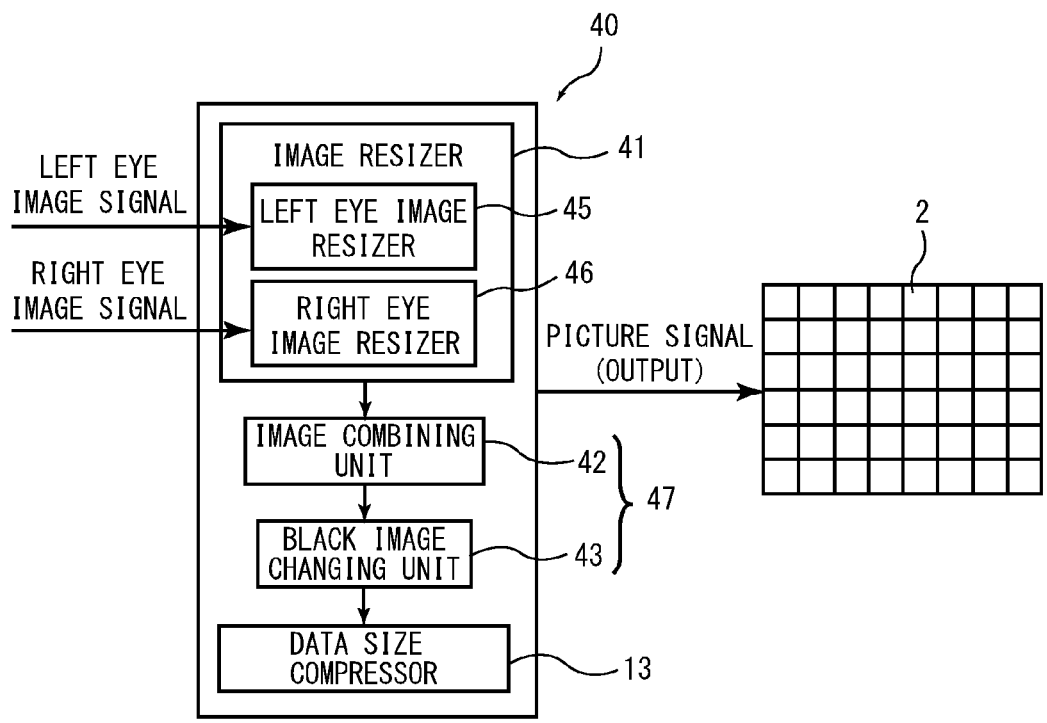
FIG. 6 is a schematic block diagram of a three-dimensional image data generating device according to a second embodiment.

FIG. 6 is a schematic block diagram of the configuration of a three-dimensional image data generating device 40 according to a second embodiment. The configuration in the present embodiment is different from the configuration in the first embodiment in that changing portions of each of the left eye image and the right eye image into black images forms black image regions 23 and 24. The same components as in the first embodiment are represented with the same reference signs and the description will be omitted below.

Specifically, as illustrated in FIG. 6, the three-dimensional image data generating device 40 includes a black image changing unit 43 configured to change portions of the left eye image and the right eye image that have been combined using an image combining unit 42 into black images. The black image changing unit 43 is configured to change the portions corresponding to the black image regions 23 and 24 in the first embodiment into black images in the combined image obtained by combining the left eye image and the right eye image. In other words, the edges of the left eye image and the right eye image that adjoin each other are changed into black images while the edges of the left eye image and the right eye image which are opposite to the adjoining edges are also changed into black images. Note that the image combining unit 42 and the black image changing unit 43 correspond to a combined image generator 47.

This can form black image regions in a combined image, similarly to the first embodiment and thus can prevent the left eye image and the right eye image from directly adjoining each other in the combined image. This can prevent the combined image from being distorted at the boundary between the left eye image and the right eye image after the lossy compression of the picture signal of the combined image, similarly to the first embodiment, and thus can prevent the reduction of the display quality when the three-dimensional image is displayed using the image data of the combined image compressed with lossy compression.

Black image regions are formed on both of the edges of each of the left eye image and the right eye image in the direction in which the left eye image and the right eye image are arranged in the combined image. This can prevent the image location of the three-dimensional image from moving to the rear of the display screen, similarly to the first embodiment.

An image resizer 41 includes a left eye image resizer 45 configured to halve the lateral size of the left eye image and a right eye image resizer 46 configured to halve the lateral size of the right eye image.

The image combining unit 42 of the present embodiment generates a combined image while arranging the resized left eye image and right eye image directly side by side without forming the black image regions 23 and 24 as the first embodiment.

Next, the operation of the three-dimensional image data generating device 40 according to the present embodiment will be described.

Figure 7:
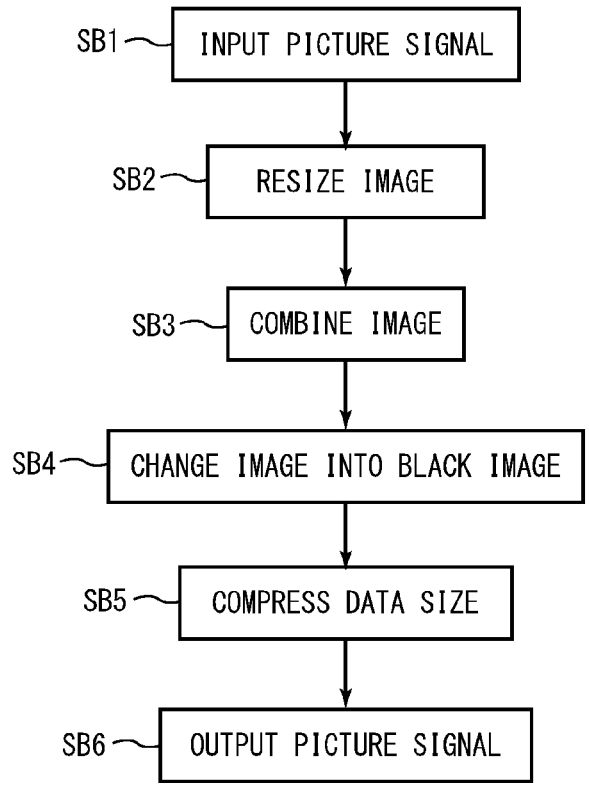
FIG. 7 is a flowchart of a three-dimensional image data generating method according to the second embodiment.

As illustrated in FIG. 7, first, the left eye picture signal and the right eye picture signal (referred to as an input picture signal with combining the picture signals in the FIG. 7) are input to the three-dimensional image data generating device 1 (step SB1). Then, the image resizer 41 converts the left eye picture signal and the right eye picture signal so as to resize each of the left eye image and the right eye image (step SB2). Specifically, the left eye image resizer 45 resizes the left eye image while the right eye image resizer 46 resizes the right eye image. The left eye image resizer 45 and the right eye image resizer 46 reduce the left eye image and the right eye image respectively, such that the lateral size of each of the left eye image and the right eye image is half the lateral size of the combined image.

Next, the image combining unit 42 combines the resized left eye image 21 and right eye image 22 while laterally arranging the images so as to obtain a combined image (step SB3). After that, the black image changing unit 43 changes both of the lateral edges of each of the left eye image and the right eye image into black images (step SB4). This forms a black image region (buffer region) between the left eye image and the right eye image and forms black image regions (dark image regions) on each of the edges of the left eye image and the right eye image which are opposite to the black image region across the left eye image and the right eye image respectively.

Then, the data compressor 13 compresses the picture signal of the combined image with lossy compression (step SB5). The compressed data is output as an output picture signal to the display device 2 or the like (step SB6).

In that case, changing both of the lateral edges of each of the left eye image and the right eye image into black images in the combined image of the left eye image and the right eye image in step SB4 corresponds to the dark image forming step. Combining the left eye image and the right eye image while laterally arranging the images in step SB3, and step SB4 correspond to the combined image generating step. Compressing the picture signal of the combined image with lossy compression in step SB5 corresponds to the image data compressing step.

Note that, in the present embodiment, the black image changing unit 43 forms the black image regions after the left eye image and the right eye image have been combined. However, the present invention is not limited to the embodiment. The black image regions can be formed at any time before the lossy compression of the picture signal of the combined image. For example, the black image regions can be formed before the left eye image and the right eye image are combined.

The black image regions are formed with the black image changing unit 43 in the present embodiment. However, the black image regions can be formed with any color other than black that is darker than the original image and does not have an influence on the display of the three-dimensional image at the boundary between the left eye image and the right eye image after the lossy compression of the combined image of the left eye image and the right eye image.

(Effect of Second Embodiment)

Converting portions of each of the left eye image and the right eye image into black images forms black image regions in the present embodiment. Providing the black image regions can prevent the reduction of the display quality of a three-dimensional image even when the three-dimensional image is displayed using a side-by-side combined image compressed with lossy compression.

In the present embodiment, the black image regions are formed on the edge of the left eye image and on the edge of the right eye image respectively. The edge of the left eye image where the black image region is formed is located on the opposite side to the edge where the black image region is formed. The edge of the right eye image where the black image region is formed is located on the opposite side to the edge where the black image region is formed. This can prevent the image location of the three-dimensional image obtained by combining the left eye image to be recognized with the left eye image and the right eye image to be recognized with the right eye from moving to the rear of the display screen.

[Third Embodiment]

Figure 8:
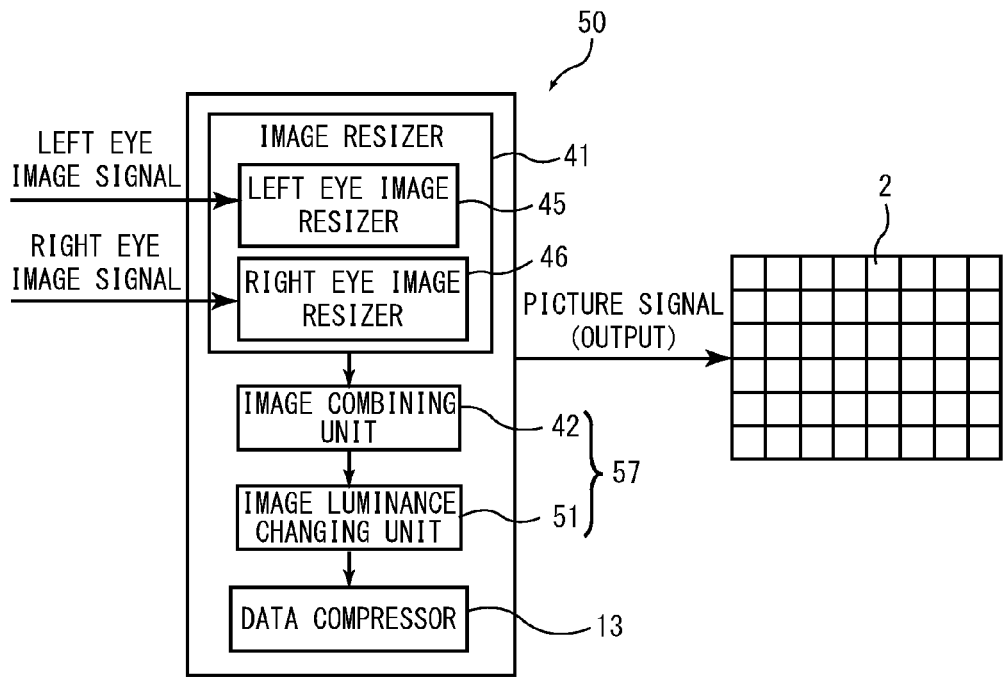
FIG. 8 is a schematic block diagram of a three-dimensional image data generating device according to a third embodiment.

FIG. 8 is a schematic block diagram of a three-dimensional image data generating device 50 according to a third embodiment. The configuration of the present embodiment is different from the configuration of the first embodiment in that making the luminance of each edge of the left eye image and the right eye image darker toward the edge provides dark image regions at the edges of each of the left eye image and the right eye image. The same components as in the first embodiment are represented with the same reference signs and the description will be omitted below.

Specifically, as illustrated in FIG. 8, the three-dimensional image data generating device 50 includes an image luminance changing unit 51 configured to change the luminance of both of the lateral edges of each of the images of each of the left eye image and the right eye image that have been combined with the image combining unit 42 toward each edge. The image luminance changing unit 51 changes the gradation of the image such that both of the lateral edges of each of the left eye image and the right eye image get darker toward each edge. Note that, when the display device 2 is a liquid crystal device, the image luminance changing unit 51 can adjust the luminance of the backlight such that both of the lateral edges of each of the left eye image and the right eye image get darker toward at each edge. The image combining unit 42 and the image luminance changing unit 51 correspond to a combined image generator 57 in the present embodiment.

Figure 9:
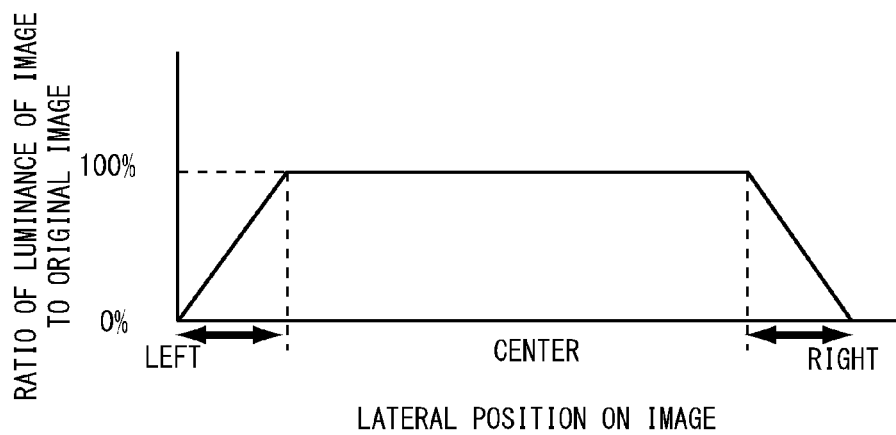
FIG. 9 is a schematic diagram of the variation of the luminance at the lateral position on an image in the three-dimensional image data generating device according to the third embodiment.

FIG. 9 illustrates the ratio of the luminance of the image when both of the lateral edges of each of the left eye image and the right eye image become darker toward each edge to the original image (the image of which luminance is not changed with the image luminance changing unit 51) as described in the present embodiment. FIG. 9 shows that the luminance of both of the lateral edges of the image is gradually reduced toward each edge in comparison with the lateral center of the image that has the original luminance of the image.

The portions in which the luminance of the image reduces in comparison with the luminance of the original image in FIG. 9 (the portions indicated by thick line arrows in the drawing) correspond to the dark image regions. The dark image regions are preferably formed at the positions similar to the positions of the black image regions 23 and 24 in the first embodiment (see FIG. 3A). In other words, in the present embodiment, the edges of the left eye image and the right eye image that adjoin each other become dark image regions. Also, the edge of the left eye image located on the opposite side to the edge where the dark image region is formed and the edge of the right eye image located on the opposite side to the edge where the dark image region is formed become dark image regions in the present embodiment.

Next, the operation of the three-dimensional image data generating device 50 in the present embodiment will be described.

Figure 10:
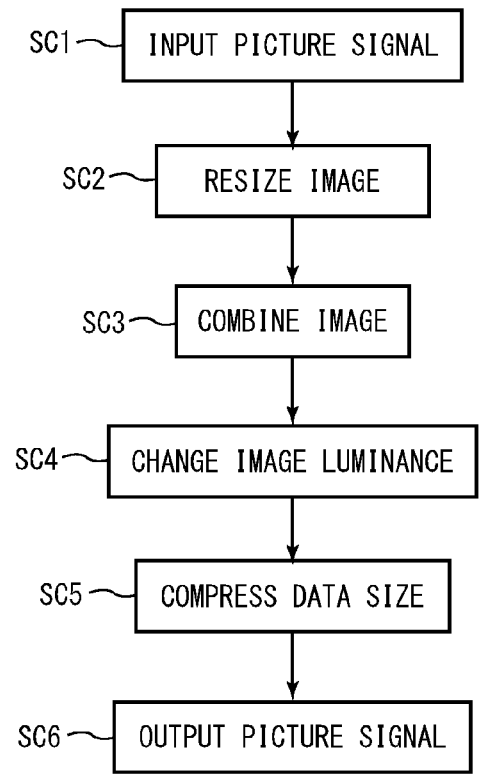
FIG. 10 is a flowchart of a three-dimensional image data generating method according to the third embodiment.

As illustrated in FIG. 10, first, the left eye picture signal and the right eye picture signal (referred to as an input picture signal with combining the picture signals in the FIG. 10) are input to the three-dimensional image data generating device 1 (step SC1). Then, the image resizer 41 converts the left eye picture signal and the right eye picture signal so as to resize each of the left eye image and the right eye image (step SC2). Specifically, the left eye image resizer 45 resizes the left eye image while the right eye image resizer 46 resizes the right eye image. Each of the left eye image resizer 45 and the right eye image resizer 46 reduces each of the left eye image and the right eye image such that the lateral size of each of the left eye image and the right eye image is half the lateral size in the combined image.

Next, the image combining unit 42 combines the resized left eye image and right eye image while laterally arranging the images so as to obtain a combined image (step SC3). After that, the image luminance changing unit 51 changes the luminance of the image such that the luminance of both of the lateral edges of each of the left eye image and the right eye image becomes darker toward each edge into black images (step SC4). This forms a dark image region (buffer region) between the left eye image and the right eye image. Also, this forms dark image regions on the edge of the left eye image and on the edge of the right eye image respectively. The edge of the left eye image where the dark image region is formed is located on the opposite side to the edge where the dark image region is formed. The edge of the right eye image where the dark image region is formed is located on the opposite side to the edge where the dark image region is formed.

Then, the data compressor 13 compresses the picture signal of the combined image with lossy compression (step SC5). The compressed data is output as an output picture signal to the display device 2 or the like (step SC6).

In that case, making the luminance of both of the lateral edges of each of the left eye image and the right eye image darker toward each edge in step SC4 corresponds to the image luminance changing step. Combining the left eye image and the right eye image while laterally arranging the images in step SC3, and step SC4 correspond to the combined image generating step. Compressing the picture signal of the combined image with lossy compression in step SC5 corresponds to the image data compressing step.

Note that, in the present embodiment, the image luminance changing unit 51 forms the dark image regions after the left eye image and the right eye image have been combined. However, the present invention is not limited to the embodiment. The dark image regions can be formed at any time before the lossy compression of the picture signal of the combined image. For example, the dark image regions can be formed before the left eye image and the right eye image are combined.

(Effect of Third Embodiment)

Making the luminance of both of the lateral edges of each of the left eye image and the right eye image darker toward each edge forms the dark image regions provides dark image regions in the present embodiment. This can prevent the reduction of the display quality even when the three-dimensional image is displayed using a side-by-side combined image compressed with lossy compression, similarly to the first embodiment and the second embodiment.

Further, the luminance of both of the lateral edges of each of the left eye image and the right eye image gets darker toward each edge forms the dark image regions in the present embodiment. This can reduce the incongruity between the dark image regions and each of the left eye image and the right eye image.

[Fourth Embodiment]

Figure 11:
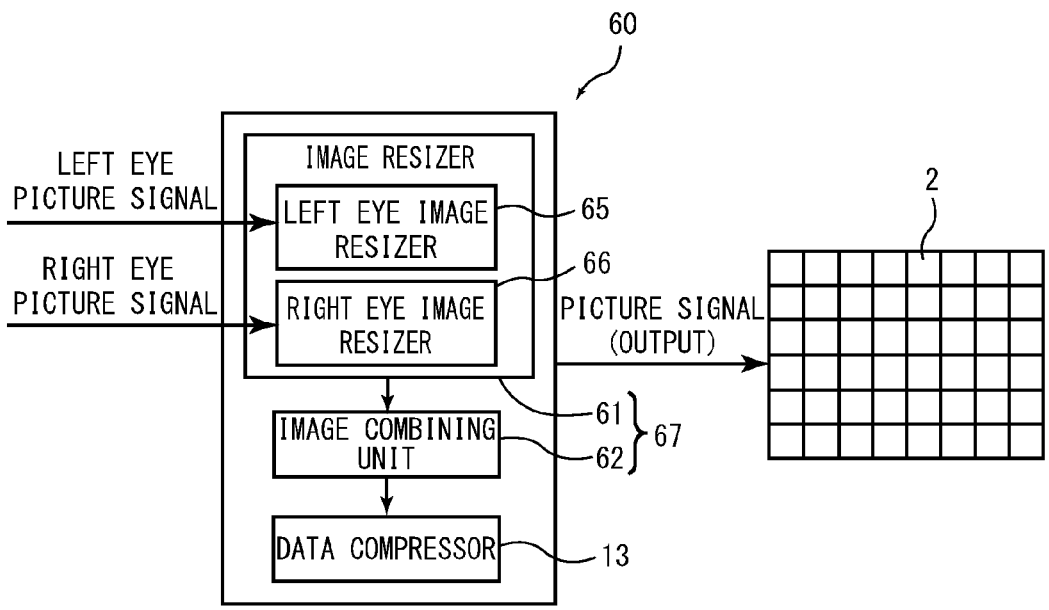
FIG. 11 is a schematic block diagram of a three-dimensional image data generating device according to a fourth embodiment.
Figure 12A:
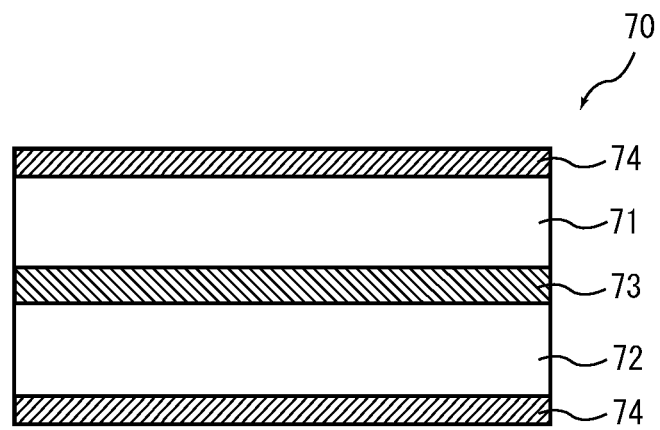
FIG. 12A is a diagram of a combined image including dark image regions on both of the vertical edges of each image.

FIG. 11 is a schematic block diagram of a three-dimensional image data generating device 60 according to a fourth embodiment. The fourth embodiment is different from the first embodiment in that a left eye image and a right eye image are arranged one above the other to form a combined image or, in other word, top-and-bottom image data is generated as illustrated in FIG. 12A. The same components as in the first embodiment are represented with the same reference signs and the description will be omitted below.

Specifically, an image resizer 61 reduces the vertical sizes of the left eye image and the right eye image. In greater detail, a left eye image resizer 65 vertically reduces the left eye image and a right eye image resizer 66 vertically reduces the right eye image. As illustrated in FIG. 12A, black image regions 73 and 74 are formed on the tops and bottoms of a left eye image 71 and a right eye image 72 in the present embodiment. Thus, each of the left eye image resizer 65 and the right eye image resizer 66 reduces each of the vertical sizes of the left eye image and the right eye image such that the left eye image and the right eye image have half the vertical size of the portion obtained by subtracting the black image regions 73 and 74 from the combined image 70. Note that the black image region 73 corresponds to the buffer region and the black image regions 74 correspond to the dark image regions in the present embodiment.

Figure 12B:
FIG. 12B is a diagram of a three-dimensional image displayed using the image data illustrated in FIG. 12A.

An image combining unit 62 combines the left eye image 71 resized with the left eye image resizer 65 and the right eye image 72 resized with the right eye image resizer 66 while arranging the images one above the other. This provides the combined image 70 illustrated in FIG. 12A. The combined image 70 looks as illustrated in FIG. 12B when being displayed as a three-dimensional image on the display device 2. In other words, the black image regions 74 and 74 are displayed on the top and bottom of a three-dimensional image 75 as illustrated in FIG. 12B. The image resizer 61 and the image combining unit 62 correspond to a combined image generator 67 in the present embodiment.

Forming the black image regions 73 and 74 on the tops and bottoms of the left eye image 71 and the right eye image 72 can prevent the three-dimensional image from being distorted at the boundary area between the left eye image 71 and the right eye image 72 even when the top-and-bottom image data compressed with lossy compression is displayed as the three-dimensional image.

Note that the detailed description of the operation of the three-dimensional image data generating device 60 in the present embodiment will be omitted because the operation is the same as the operation in the first embodiment.

Reducing the vertical sizes of the left eye image and the right eye image with the image resizer 61 forms the buffer region (the black image region 73). However, the buffer region can be formed, for example, by changing portions of the images into a black image as the second embodiment or by changing the luminance of portions of the images as the third embodiment.

(Effect of Fourth Embodiment)

When top-and-bottom image data obtained by combining the left eye image 71 and the right eye image 72 while arranging the images one above the other is generated, the black image regions 73 and 74 are formed on both of the vertical edges of each of the left eye image 71 and the right eye image 72 in the present embodiment. This can prevent the left eye image 71 and the right eye image 72 from directly adjoining each other, and thus can prevent the reduction of the display quality of a three-dimensional image even when the three-dimensional image is displayed using the top-and-bottom image data compressed with lossy compression.

Further, the black image regions 74 are formed on the edge of the left eye image and on the edge of the right eye image respectively. The edge of the left eye image where the black image region 74 is formed is located on the opposite side to the edge where the black image region 73 is formed. The edge of the right eye image where the black image region 74 is formed is located on the opposite side to the edge where the black image region 73 is formed. This can prevent the left eye image to be recognized with the left eye image and the right eye image to be recognized with the right eye from being vertically distorted when the black image region 73 is provided. Thus, the above-mentioned configuration can prevent the reduction in the display quality of a three-dimensional image.

[Other Embodiments]

The embodiments of the present invention have been described above. The embodiments are merely examples of the implementations of the present invention. Thus, the present invention is not limited to the embodiments. The embodiments can appropriately be changed and implemented without departing from the gist of the present invention.

The combined image is generated while a left eye image 21 and a right eye image 22 are arranged in each of the embodiments. However, at least one of the left eye image 21 and the right eye image 22 that form the combined image can include a plurality of images.

Each of the three-dimensional image data generating devices 1, 40, 50, and 60 configured to generate a combined image by combining the left eye image 21 and the right eye image 22 is provided separately from the camera and the display device in each of the embodiments. However, each of the three-dimensional image data generating devices 1, 40, 50, and 60 can be integrated with the camera or the display device. Alternatively, each of the three-dimensional image data generating devices 1, 40, 50, and 60 can be integrated with a recording device configured to record image data in a recording medium a recording disk or the like.

The black image regions 23 and 24, 73 and 74, or the dark image regions are formed not only between the left eye image 21 and the right eye image 22, or the left eye image 71 and the right eye image 72, but also on both edges in the direction in which the left eye image 21 and the right eye image 22, or the left eye image 71 and the right eye image 72 are arranged in the combined image 20 or 70 in each of the embodiments. However, the black image region or the dark image region can be formed only between the left eye image and the right eye image.

The black image regions 23 and 24 are formed on both edges of each of the left eye image 21 and the right eye image 22 and the black image regions 73 and 74 are formed on both edges of each of the left eye image 71 and the right eye image 72 in the first, second, and fourth embodiments. However, the black image regions 24 and 74 can be displayed as dark image regions in a color darker than the original image and other than black. The black image regions 23 and 73 can be displayed as buffer regions in a color darker than the original image and other than black, and does not have an influence on the display of the three-dimensional image at the boundary of the left eye image and the right eye image after the lossy compression of the combined image obtained by combining the left eye image and the right eye image.

INDUSTRIAL APPLICABILITY

The three-dimensional image data generating method according to the present invention is applicable to a three-dimensional image data generating method that generates an image while arranging a right eye image and a left eye image.

What is claimed is:

1. A three-dimensional image data generating method that generates a combined image while arranging a left eye image and a right eye image, the method comprising:
   a combined image generating step in which the combined image includes a left eye image, right eye image, and a buffer region between the left eye image and the right eye image is generated while the left eye image and the right eye image are arranged; and
   an image data compressing step in which a picture signal, which includes the combined image, is compressed with lossy compression, wherein
   the combined image generating step includes an image luminance changing step in which the buffer region is formed by making luminance of edges of the left eye image and the right eye image that adjoin each other lower toward the edges.

2. The three-dimensional image data generating method according to claim 1,
   wherein the combined image including dark image regions located so as to face the buffer region across each of the left eye image and right eye image is generated in the combined image generating step.

* * * * *